April 6, 1948.  A. M. GRONNINGSAETER  2,438,911
PROCESS FOR RECOVERING METAL VALUES FROM SLAGS
Filed April 21, 1945   2 Sheets-Sheet 1
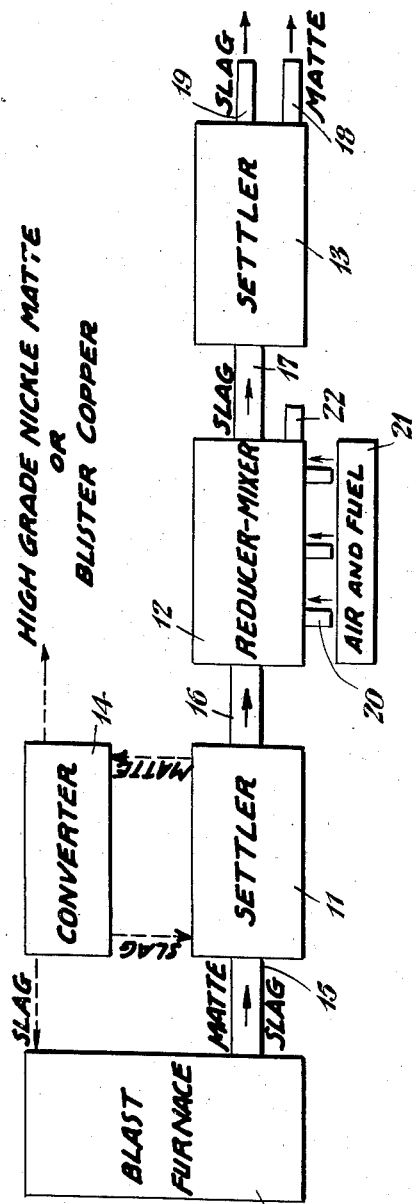
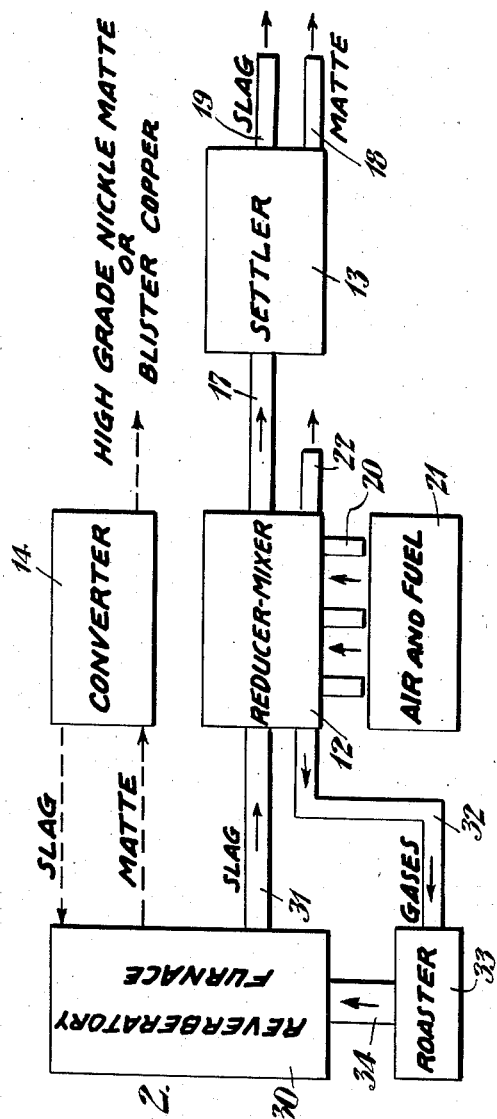
INVENTOR
ANTON MARTIN GRONNINGSAETER
BY
ATTORNEYS April 6, 1948.  A. M. GRONNINGSAETER  2,438,911
PROCESS FOR RECOVERING METAL VALUES FROM SLAGS
Filed April 21, 1945  2 Sheets-Sheet 2
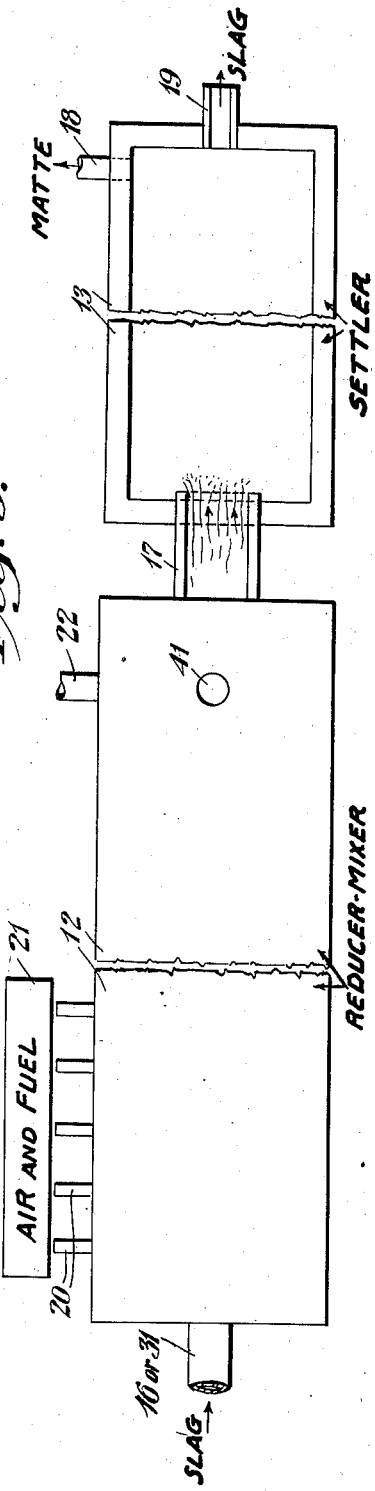
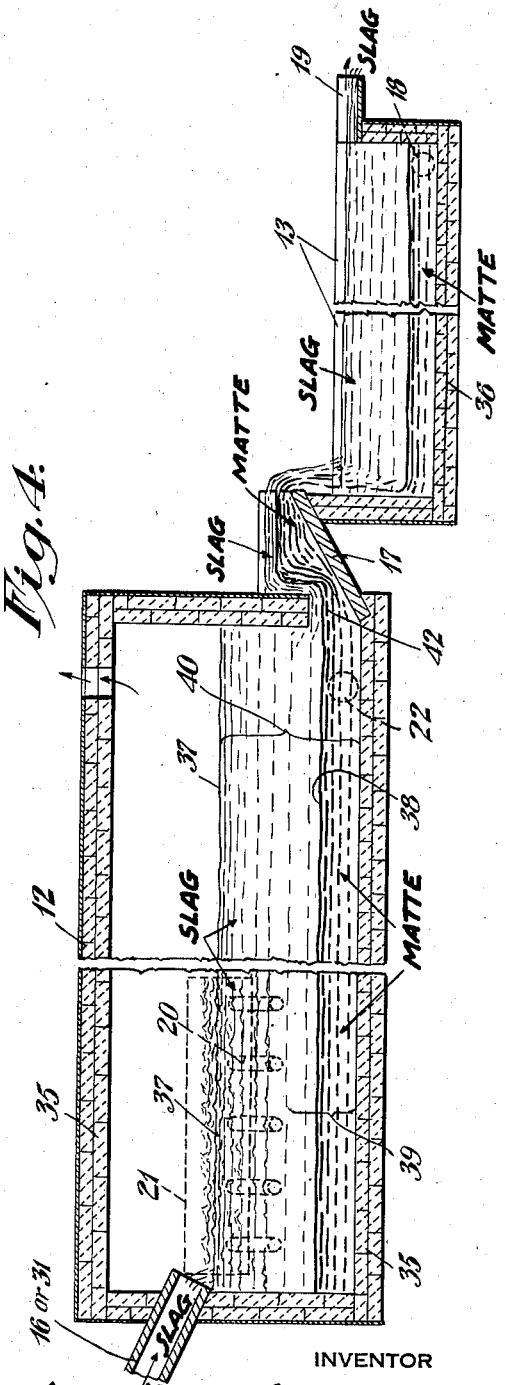
INVENTOR
ANTON MARTIN GRONNINGSAETER
BY
ATTORNEYS Patented Apr. 6, 1948

2,438,911

UNITED STATES PATENT OFFICE 2,438,911

PROCESS FOR RECOVERING METAL VALUES FROM SLAGS

Anton Martin Gronningsaeter, New York, N. Y., assignor to Falconbridge Nickel Mines, Limited, Toronto, Ontario, Canada, a corporation of Canada Application April 21, 1945, Serial No. 589,674

17 Claims. (Cl. 75—24)

This invention relates to the production of metals, and has for its object certain improvements in the method of producing metals, such as nickel and copper. The invention relates more particularly to improvements in the treatment of slags obtained in the smelting of metal ores, such as nickel and copper ores, to recover a substantial amount of their metal values.

There are at present two conventional methods of smelting nickel and copper ores in which the essential metals, nickel and copper, as well as a substantial amount of iron, are present as sulfides. Each of these methods results in the production of mattes and slags; and includes a procedure for treating the slags to recover as much of their nickel and copper content as possible under the circumstances.

According to one of said methods, known as the blast furnace practice, a charge of suitably prepared nickel ore is smelted in a blast furnace. The charge consists, for example, of unroasted ore, sintered flotation concentrates and flue dust, converter slag, limestone and coke. The smelting results in the production of a low-grade matte and a slag. The fluid slag and matte are run into a settling vessel, known as a settler. The blast furnace matte contains, for example, iron, copper, nickel, cobalt and sulfur. This low-grade matte is then transferred to a converter where it is blown with air until the iron is oxidized and fluxed, and passes almost completely into the resulting converter slag, leaving a high-grade converter matte consisting mostly of nickel, copper and sulfur, with very little iron. The converter slag contains an appreciable amount of matte prills, and hence valuable nickel and copper, which fail to settle and merge with the matte. It also contains copper, nickel, and most of the cobalt as oxides and silicates; and metal sulfides in solution. A portion of the converter slag is in some instances chilled and used as a basic flux in the blast furnace, while the remainder of the liquid converter slag is poured into the settler, where it is imperfectly mixed with the blast furnace slag; and a partial cleaning takes place while matte prills settle to the bottom. The slag portion of the mixture is discarded, and the matte is treated in the converter.

Substantially the same procedure is followed in the other conventional method of smelting nickel ores, known as the reverberatory furnace practice. Instead of a blast furnace, a reverberatory furnace is employed to produce the initial low-grade matte. The reverberatory matte is then treated in a converter to obtain a high-grade matte consisting essentially of nickel, copper and sulfur, with very little iron. The converter slag is transferred while still liquid to the reverberatory where it is imperfectly mixed with the slag of the regular charge; the matte prills settle out, and the matte is transferred to the converter. The resulting reverberatory slag is discarded.

These two main methods of smelting nickel ores may, of course, be varied in operating detail. An effort is made in both methods to recover as much as possible of the valuable nickel and copper which find their way into the slag. A typical converter slag may contain from 1 to 5% of nickel plus copper, and it is therefore economically inadvisable to discard the slag without recovering at least some of the nickel and copper.

The presence of nickel and copper in the converter slag is due partly to mechanical and partly to chemical causes. The slag contains some matte prills in suspension. Failure of the matte prills to settle may be due in large part to lack of time before skimming the slag from the converter. If sufficient time were taken to permit more complete settling out of the prills, too much of the air-blowing time of the converter would be wasted. Converter slags have a high specific gravity on account of their high iron content, which tends to retard the settling rate of the prills, as probably does the high content of magnetite.

Chemical losses in the converter slag appear to be due to a number of causes. Among these is the solution of sulfides of copper, nickel, cobalt and iron in slag silicates. It is believed that the copper sulfide is relatively more soluble than the nickel sulfide. While the solubility of these metal sulfides in the slag silicates appears to be more greatly affected by iron silicate, other silicates present in the slag likewise appear to have some effect thereon. The factor of differences of solubility of such metal sulfides, including iron sulfide, in slags of different composition is of considerable importance and must be given due attention when dealing with slag losses. The solubility of the sulfides of copper, nickel and iron in iron silicates is relatively high, although this solubility is not in direct proportion to the iron content of the slag but increases more rapidly than the iron content does. This may be illustrated by such data as the following:

|  | Fe | $SiO_2$ | $Al_2O_3$ | S |
|---|---|---|---|---|
| Converter Slag | 57.2 | 12.5 | 4.0 | 4.6 |
| Converter Slag | 52.2 | 18.23 | ---- | 3.6 |
| Blast Furnace Slag | 37.1 | 36.9 | 8.50 | 1.57 |
| Blast Furnace Slag | 28.6 | 35.4 | 11.90 | 1.14 |
| Blast Furnace Slag | 28.2 | 36.5 | 13.00 | 0.70 |

The figures given are in percentages. It will be noted that as the amount of iron, Fe, increases, the amount of sulfur, S, increases at an accelerated rate. The amount of sulfur, of course, indicates the amount of metal sulfides present in the slags. The result is that when two slags of different iron content and hence different solubility characteristics for metal sulfides are mixed, the total solubility of metal sulfides in the mixed slag is less than the sum of the solubility of the metal sulfides of the two components and metal sulfides are therefore "salted out" of the slag by the mixing. The chemical losses in the converter slag also appear to be due in part to the formation of oxides or silicates of nickel and copper, as well as the oxide and silicate of cobalt if it is desired to recover the cobalt, particularly in the finishing period of blowing the matte with air. Chemical losses in the converter slag in the third place also appear to be due to the presence in the slag of iron in the form of magnetite, which appears to carry a considerable amount of the nickel and copper combined either chemically or mechanically.

The converter slag may be substantially freed of nickel and copper by cooling; breaking up the solidified slag and resmelting it with the nickel ore in the blast furnace, as indicated above. By such resmelting, the matte prills are given an opportunity to settle in the normal way in a slag of normal temperature, viscosity and specific gravity. The broken up converter slag is mixed with the slag from the ore charge, and by this mixing the sulfides in the original converter slag are salted out to the point that corresponds to their regular solubility in a slag of the composition of the blast furnace slag. Oxides and silicates of nickel and copper are at least to a very substantial amount again reduced and, in the presence of iron sulfide, regardless of what the intermediate reactions may be, end up as copper-nickel sulfides. It is believed that the reduction is fairly complete for copper and nickel but not for cobalt, usually present in nickel-bearing ores. Magnetite is soluble in iron sulfide to a considerable extent and a considerable part of the magnetite present in the converter slag goes into the matte. A substantial amount of magnetite goes into the final slag. In the blast furnace, but not to the same extent in the reverberatory furnace, the magnetite is partly reduced so in most cases the remaining amount is perhaps in proper solution in the slag, and the combination between magnetite, nickel and copper is perhaps at the same time broken up. The indications therefore are that by resmelting the converter slag in the blast furnace, the recovery of nickel and copper from the slag is carried about as far as it can be under the circumstances for a final slag of given composition.

On the other hand, when converter slag is returned while still in liquid form to the settler or to the reverberatory furnace, conditions are substantially different. In the settler there is the disadvantage of somewhat lower slag temperature, which tends to inhibit the settling out of matte prills. In both the blast furnace settler and the reverberatory furnace, conditions are such that the silicates and oxides of nickel and copper and magnetite carrying valuable metals are likely to pass through more or less unchanged. This appears to be due to the fact that there is insufficient opportunity for these compounds to be reduced or dissolved in matte and to the further fact that there is insufficient opportunity for thoroughly mixing the liquid converter-slag with the blast-furnace slag or the reverberatory furnace slag proper so that the mixtures may be conditioned to make possible the "salting out" of some of the dissolved sulfides. In addition, considerable variation in escaping slag composition is caused by unavoidable irregular return of liquid converter slag to the reverberatory furnace or settler. It is well recognized that the return of the liquid converter slag to settlers or to reverberatory furnaces will appreciably increase the slag losses. However, the increase is generally not sufficient to justify cooling, breaking up and resmelting of any more of the converter slag than is required as a flux.

Experience shows that the slag losses in reverberatory smelting are even higher than the slag losses in blast furnace smelting, with slags of similar composition; presumably because reducing conditions in the reverberatory furnace are not as good as those in the blast furnace. The slag losses in the reverberatory furnace are, therefore, increased on account of larger amounts of oxides and silicates, and the presence of more magnetite which is generally also formed by the roasting of the ore before it is charged into the reverberatory furnace besides being introduced from the liquid converter slag. Slag losses in reverberatory furnaces are often increased because of irregularities in operation, when unsmelted or insufficiently heated material still containing sulfides is entrained by and moved out with the slag. The average slag losses from reverberatory furnace smelting are, therefore, probably almost always appreciably higher than is indicated by a sample of the normal slag.

In the production of copper, as distinguished from nickel, the practice is similar; and what has been said specifically with respect to nickel also holds true, at least for the most part, for copper.

It will be clear that present smelting practice leaves much to be desired with respect to nickel and copper losses in the final slags.

Various methods have been proposed to treat copper-bearing slags to recover their copper content, at least in substantial amount, apart from the conventional practice of chilling and returning a portion of the converter slag as flux to a blast furnace and passing the remainder of the converter slag to a settler, and of returning the molten converter slag to a reverberatory furnace, such as just described. Practically all investigations have been directed toward the cleaning of converter slags alone, with the view of discarding the final slag freed of the desired metals.

One early investigator, for example, subjected a bath of converter slag to a reduction operation to release and settle out the copper. To this end, he placed fine coke on the bath and stirred the molten slag with a green pole to mix the coke thoroughly into the slag. He operated under the theory that the copper is present in the slag as copper sulfide; that the slag is charged with magnetic oxide of iron; that the copper sulfide is dissolved in the magnetic oxide of iron; that the reduction step causes the magnetic oxide of iron to release the copper; and that the released copper then settles out. Operating with converter slags containing 2½% copper, he found that the copper content in the slags could be reduced to 0.3-0.7%. This method leaves too much valuable copper in the slag in view of the inconvenience and cost to practice it, so that the proposal has not attained any commercial success. It was abandoned.

Instead of stirring the reducing agent into the bath of converter slag, other investigators later proposed to inject the reducing agent, such as pulverized coal, through the bath, preferably through a bath of slag in contact with matte.

They operated under the theory that copper is present in the slag as copper oxide; that the slag contains magnetite, $Fe_3O_4$; that the magnetite holds the copper in solution or in suspension; that the reduction step causes the magnetite to release the copper; and that the released copper then settles out. The reduction operation is conducted until an appreciable amount of the iron oxide in the slag is reduced to metallic iron and the metallic iron is dissolved in the matte to give a slag of higher silicate degree and of lower specific gravity, so that the slag holds less copper matte in solution or suspension. The work of these investigators appears to have been confined almost exclusively to the treatment of converter slags, although they indicate the possibility of treating blast and reverberatory slags. The method proposed has not been used commercially.

My experimental investigations have confirmed my discovery that if the slags are properly treated, a substantial amount of their metallic values may be economically recovered. This is particularly true of blast furnace or reverberatory furnace slags containing valuable amounts of such metals as copper, nickel and cobalt. To obtain these long sought-for results, a workable hypothesis or theory of the nature and characteristics of the slags appears necessary, so that the method of treating the slags may be varied accordingly. Those engaged in this industry appreciate that the best present knowledge of such slags is imperfect and certainly not exact in all particulars. While our supposed knowledge may be incomplete and theoretical, at least in part, it does seem true that practical methods of treatment are seldom based on fallacious theories; they are usually based on a fairly accurate appraisal of what takes place. I am convinced that methods proposed by prior investigators, such as those referred to, failed because they are unsuited economically and metallurgically for slags of the composition actually treated.

The above-mentioned attempts to clean converter slag alone have not been commercially successful, apparently due to a lack of appreciation of the metal sulfide solubility conditions in such slags. The converter slag has too high an iron content and too high a metal sulfide solubility to make it possible regularly to lower the copper-nickel content of the slag sufficiently to discard it directly without going to the extreme step of reducing out metallic iron and thereby lowering the metal sulfide solubility in the remaining slag.

It is necessary to obtain a final slag lower in iron than the converter slag, and therefore of lower metal sulfide solubility. By specially mixing the high iron converter slag with a lower iron slag, so to say using the ore slag as a flux, it is possible to get a metal sulfide "salting out" action. That is, sulfides of copper, nickel, cobalt and iron may be thrown out of solution in the iron silicate.

Imperfectly mixed but partly cleaned slags from a reverberatory furnace or a blast furnace settler are passed through a reducer-mixer vessel while blowing in coal, or other reducing agent. I have found that by taking advantage of the selective reduction of the series copper-nickel-cobalt-iron oxides, I can so regulate reduction of the liquid slags that substantially all, or most of the very small amounts, of the copper and nickel oxides and silicates in the slags are reduced and converted to their sulfides in the presence of iron sulfides, by a comparatively short treatment without reducing much of the oxide and silicate of cobalt or an appreciable amount of the iron oxides. I have further found that by passing the slag mixture, already partly cleaned, continuously and relatively quickly through a reducer-mixer, and regulating the amount of fuel for reduction, the temperature and the time of slag mixture staying in the reducer-mixer vessel, I can obtain substantially the selective reduction I am aiming for at the same time as I obtain the desired mixing and "salting out" of metal sulfides. It appears that the small and well distributed particles of "salted out" iron sulfide function to convert the reduced nickel and copper to their sulfides.

Previous investigators seem to have paid major attention to the reduction of magnetite, which needs a prolonged and expensive treatment. My investigations indicate that such substantial reduction of magnetite is not necessary and that nickel and copper oxides and silicates are substantially reduced before a substantial reduction of magnetite takes place. Even if a certain amount of nickel and copper is connected or tied up with magnetite in the converter slag, this is substantially overcome in my way of operation, first by returning the converter slag to a reverberatory furnace or to a settler where a large part of the magnetite is dissolved in the iron sulfide in the low-grade matte, and next the remaining magnetite is diluted by the ore slag to such a low percentage that it, by the mixing operation, probably goes into the slag dissolved, or otherwise, in such form that it retains no appreciable amount of nickel and copper. The lowering of magnetite in the final slag indicated in my experiments may be due in part to solution of the magnetite in the iron sulfide in the matte prills present in the slag entering the reducer-mixer and due in part to solution in the "salted out" sulfides, although it may also be due in small part to reduction.

The economy of the method can, besides the "salting out" principle, be said to depend upon selective reduction. The aim is to reduce only copper and nickel oxides and silicates, not cobalt and iron compounds, in case the cobalt is to be excluded. As the slags have already been partly cleaned in the reverberatory or settlers, comparatively little reduction is needed, and it is found that the reduction obtained by passing the slags continuously and relatively quickly through a reducer-mixer is sufficient. It is only a question of reducing fractions of 1% of copper and nickel compounds. In present reverberatory practice, as noted above, slag losses in reverberatory furnaces are often increased because of irregularities in operation, when unsmelted or insufficiently heated material still containing metal sulfides is entrained by and moved out with the slag. The average slag losses from reverberatory furnace smelting are therefore probably almost always appreciably higher than is indicated by a sample of the normal slag. When using my method, these unsmelted or semi-smelted sulfides are smelted in the reducer-mixer, the slag losses are lowered correspondingly and an analysis of the final slag gives a reasonably correct picture of what has taken place.

One advantage of the method is that slags of higher iron content will be practical, permitting more flexibility in operations. In copper and nickel smelting there is generally a limit to the iron content in the final slag, above which the metal losses increase to a point considered uneconomical. While higher iron content in the slags increases metal losses also when using my process, due to higher metal sulfide solubility, the difference is not so large. In some cases it will be economical to aim as a regular practice for a somewhat higher iron in the slags than before and any accidental extra high iron will not be so serious as before. The reducer-mixer acts as a "flywheel" to even out variations of iron in the slag due to the irregularities in the return of liquid converter slag or to other reasons. It is therefore unnecessary to regulate smelting conditions in reverberatory and blast furnaces as carefully as heretofore, because the irregularities may be corrected in the reducer-mixer. This permits more flexibility in smelting operations with increased economy. The process also permits greater flexibility in the choice of both converter and reverberatory slags and therefore the lowering of the quantities of fluxes needed and more variations in their composition; the process permits the use of a lower grade of concentrate with correspondingly lower tailing losses. This increased flexibility in meeting existing conditions is highly important economically.

The above-described operation of the process is primarily for the recovery of copper and nickel but not of cobalt. However, I have further found that by more intensive reduction, more coal or more time or a higher temperature or a combination of all, I can reduce most of the cobalt and collect it in a matte either in the same operation that recovers copper and nickel, or in a separate operation that follows the treatment for copper-nickel recovery. For cobalt recovery, batch treatment and as intensive mixing as possible with a large excess of iron sulfide appear advantageous.

These and other features of the invention will be better understood by referring to the accompanying drawing, taken in conjunction with the following description, in which—

Fig. 1 is a diagrammatic representation of apparatus illustrative of the invention, which is adapted for blast furnace practice;

Fig. 2 shows a modified form of the apparatus adapted for reverberatory furnace practice;

Fig. 3 is a plan view of a reducer-mixer associated with a settler, which may be used in conjunction with the apparatus of the above figures; and Fig. 4 is an elevation in section of the arrangement shown in Fig. 3.

Referring first to Fig. 1, the apparatus shown comprises a smelting furnace in the form of a blast furnace 10, a settler 11, a reducer-mixer 12, a second settler 13, and a converter 14. A matte-slag conduit 15 connects the blast furnace with the settler; a slag conduit 16 connects the first settler with the reducer-mixer; and a slag-matte conduit 17 connects the reducer-mixer with the second settler. The second settler is provided with a matte discharge 18 and a slag discharge 19. Means, not shown, are provided for transferring liquid slag from the converter to the settler, as well as solid slag to the blast furnace, if desired, and matte from the first settler to the converter.

The reducer-mixer may be patterned after the conventional converter, or slag fuming furnace, and is provided with a plurality of nozzles 20, adapted for the passage therethrough of air admixed with fuel into the reducer-mixer; conventional means 21 for mixing the air and fuel and injecting the same into the reducer-mixer; an extra discharge 22; and an opening, not shown, for the escape of gases.

Referring next to Fig. 2, the apparatus shown is essentially the same as just described, except that the smelting furnace is in the form of a reverberatory furnace 30, with means, not shown, for transferring matte from the reverberatory to the converter, and slag from the converter to the reverberatory. A slag conduit 31 connects the reverberatory with the reducer-mixer 21, while a gas conduit 32 connects the reducer-mixer with a roaster 33, which in turn communicates with the reverberatory furnace by means of a connection 34.

Referring, finally, to Figs. 3 and 4, the apparatus shown is a somewhat more detailed arrangement of a reducer-mixer 12, with a brick lining 35, and a settler 13, with a brick lining 36, which was employed in my experiments, to be discussed below. In the construction illustrated, slag charging conduit 16 is inclined downwardly into the interior of one end of the reducer-mixer, preferably terminating slightly above its normal slag level 37. A plurality of nozzles or tuyères 20 connect with the interior of the slag-charging portion of the reducer-mixer, preferably well within the normal slag zone, as shown, that is, between slag level 37 and matte level 38. This arrangement provides a relatively quiescent zone 39 below the tuyères and a relatively quiescent zone 40 beyond the tuyères toward the opposite or slag-matte discharging end of the reducer-mixer, ahead of settler 13. An opening or vent 41 is provided in the top of the reducer-mixer, preferably near the discharging end of the reducer-mixer, for the escape of gases. Slag conduit 17 connects with an outlet 42 at the bottom of the discharging end of the reducer-mixer. This conduit is advantageously in the form of an open trap-trough or trap-spout, shaped as shown. The bottom of the trough is inclined upwardly and the side walls of the trough are parallel to one another, extending a suitable distance above outlet 42. As is to be explained in more detail below, the trough is so proportioned as to permit passage therethrough of matte and slag from the reducer-mixer to the settler to maintain a substantially constant slag level within the reducer-mixer. The discharge end of the trough extends over the top of the settler, so that matte and slag passing through the trough may fall within the interior of the settler. Conduit 18 is located at the bottom of the settler for the discharge of matte and conduit 19 is located at a higher level for the discharge of final slag.

The apparatus of Fig. 1 may be operated as follows:

Nickel ore is charged into blast furnace 10, where it undergoes initial smelting. The resulting mixture of matte and slag is conducted substantially continuously through conduit 15 into first settler 11. Matte is withdrawn from the settler and transferred to converter 14, where it is blown with air in the usual manner to remove objectionable iron present therein. High-grade nickel matte is formed and withdrawn as such from the converter. The resulting converter slag may be advantageously withdrawn in part, chilled and broken up, after which it is introduced into the blast furnace charge to function essentially as basic flux material.

The remainder of the converter slag, or all of the converter slag, as the case may be, is passed in liquid form into first settler 11, where it is admixed with slag and matte coming from the blast furnace; and the combined slags are passed through conduit 16 into reducer-mixer 12. Due to the agitation caused by the introduction of air and fuel into the reducer-mixer, the slags are intimately admixed above relatively quiescent zone 39 (see Fig. 4), which causes some of the nickel and copper sulfides present in the converter slag to salt out, at the same time as the slags are exposed to selective reducing conditions in the presence of iron sulfide. Matte prills settle and form a layer of matte at the bottom of the reducer-mixer, in zones 39 and 40, as shown in Fig. 4. Slag and matte are withdrawn from the reducer-mixer through conduit 17 into second settler 13. The slag is permitted to remain substantially quiescent so that additional matte prills may settle by gravity to the bottom to merge with matte forming thereon. The settler matte is withdrawn through discharge 18, while the final slag is withdrawn through discharge 19 and discarded.

Substantially the same procedure is followed when smelting copper ores in accordance with the blast furnace practice. In such cases blister copper is of course withdrawn from the converter.

The apparatus shown in Fig. 2 may be operated as follows:

Nickel ore is fed into reverberatory furnace 30 in the usual manner, for example, from roaster 33 through connection 34. The resulting matte is transferred to converter 14, where it is blown with air to eliminate objectionable iron. High-grade nickel matte is formed and withdrawn from the converter. The resulting converter slag is transferred to the reverberatory furnace while still liquid, where it merges with the reverberatory slag proper, and where it is freed of nickel and copper to some extent. The admixed slags are conducted substantially continuously, the flow of slag being interrupted only while matte is tapped into the converter, into reducer-mixer 12. Here the slags are subjected, in the presence of iron sulfide, to the reducing and mixing action of air and fuel introduced through nozzles 20. This operation is described more fully below in the case of Figs. 3 and 4. The resulting slag and matte are withdrawn through conduit 17 into settler 13. Matte is withdrawn through discharge 18 while the final slag is withdrawn through discharge 19 and discarded. Gaseous products of combustion formed in the reducer-mixer may be conducted through conduit 32 into roaster 33, where their heat is effectively utilized to roast ores about to be charged to the reverberatory furnace through connection 34, or the hot gases may be otherwise utilized.

In the production of copper, substantially the same practice is followed. The copper ore is initially smelted in the reverberatory furnace. The resulting matte is conducted to the converter where it is blown with air to form blister copper; while the converter slag is returned to the reverberatory furnace to be admixed with the reverberatory slag. The admixed slags are then conducted to the reducer-mixer where they are subjected to reduction and mixing. The slag and matte are withdrawn from the reducer-mixer and are flowed into the settler. Matte prills settle to the bottom, from which the resulting matte is withdrawn. The settler slag is passed through its discharge and is discarded.

These features of the invention may be better understood by referring to the manner in which the more detailed apparatus of Figs. 3 and 4 may be operated. The slags are passed through conduit 16 or 31 into reducer-mixer 12 until slag level 37 is reached. Fuel and air are passed through nozzles or tuyères 20 into the body of slags, rather than the body of matte which tends to collect at the bottom of the reducer-mixer. This arrangement permits the use of a smaller settler, although this is not normally necessary. As noted above, the nozzles or tuyères are located toward the charging portion of the reducer-mixer. As a result of this arrangement, agitation or mixing of the slag is primarily confined to the charging portion of the reducer-mixer above the nozzles or tuyères, so that slag below the nozzles or tuyères and in the discharging portion of the reducer-mixer may be in a relatively quiescent condition, thus facilitating settling out of matte prills and merging thereof with matte at the bottom of the reducer-mixer. The amounts and rate of fuel and air passed into, and the rate of passing the slags through the reducer-mixer are regulated to insure the desired reducing and mixing conditions. The amount of reducing agent and the temperature of the slag may thus be adjusted to a point at which the desired selective reducing action or actions take place.

As further amounts of slag are passed through conduit 16 into the charging end of the reducer-mixer, matte and slag are passed from the reducer-mixer through outlet 42 at the discharging end of the reducer-mixer. Conduit 17, as pointed out above, is designed as a trap-trough or trap-spout to permit passage of matte and slag therethrough to settler 13 at a rate to maintain the slag in the reducer-mixer aprpoximately at its normal level 37. As the amount of slag in the reducer-mixer rises in level, a point is reached at which its weight is sufficient to force matte as well as slag through outlet 42, and hence through conduit or trough 17. In this manner, slag may be continuously passed into the reducer-mixer and treated slag and matte may be continuously passed out of the reducer-mixer.

Hot gases formed in the reducer-mixer as a result of the combustion of the fuel and air are passed through opening 41 in the top of the reducer-mixer near the discharging end. The hot gases may be exhausted to the open atmosphere or passed through a conduit connecting the opening to some other place for use. As shown in Fig. 2, for example, the hot gases may be passed through conduit 32 to roaster 33.

Matte and slag passing through conduit or trough 17 are dropped into settler 13, where the mixture is permitted to remain substantially quiescent. Matte prills settle out and merge with matte forming at the bottom of the settler. Since slags are continuously passed through the reducer-mixer, slag and matte may be continuously passed to the settler.

In a presently-preferred practice, finely pulverized coal is blown into the slag bath in the reducer-mixer with air, the relative amounts of air and coal being so regulated as to establish reducing conditions in and over the slag bath. The amount of air and coal is also preferably regulated in conjunction with the rate of speed with which the slags are treated to provide and maintain a predetermined desirable temperature in the slag bath; and, if desired, to raise the temperature of the slag bath to a point which assists the reduction and at which the settling out of matte prills may be facilitated when the slag is passed into the settler. The desired temperature may of course be obtained in any other suitable manner.

This operation will effect a very good mixing of the slags within the reducer-mixer and this, in turn, facilitates the salting out of the nickel and copper sulfides to a point that corresponds to the solubility of sulfides in the final mixed slag. The reducing conditions established in the presence of iron sulfide to a large extent reduce oxides and silicates of nickel and copper and convert them to sulfides. Ordinarily, there will be enough iron sulfide present in the slag to effect this highly desirable result. If not, it is advantageous to introduce special liquid matte containing the requisite iron sulfide or solid iron sulfide containing ore into the reducer-mixer.

In the production of such metals as nickel and copper, at least two different slags are produced, one in a blast furnace or in a reverberatory furnace, whichever is employed, and one in a converter. In the practice of the present invention, one slag is used to clean the other slag. The slags have differing specific gravities and differing solubility characteristics for metal sulfides normally present in the slags. The converter slag is relatively high in iron, low in silica, of higher specific gravity, and has a higher solubility characteristic for metal sulfides, while the blast furnace slag or reverberatory furnace slag, on the other hand, is lower in iron, higher in silica, of lower specific gravity, and has a lower solubility characteristic for metal sulfides. The slags are passed while still liquid into the mixing and reducing zone of the reducer-mixer, and subjected to mixing and reduction in the presence of iron sulfide at an appropriate elevated temperature. Due to the intimate admixing of the two slags, the solubility characteristics of the slags for metal sulfides are changed. The solubility characteristic of the converter slag is lowered, so that a substantial amount of its metal sulfides is salted out.

The mixing step also functions to average the specific gravities of the slags. That of the converter slag is normally so high as to retard the setting of matte prills. As a result of the intimate mixing of the two slags, the disadvantage of the higher specific gravity of the converter slag is substantially lessened, and settling conditions for matte prills are materially improved. The slag resulting from the reduction and mixing operation is permitted to settle, after which the resulting matte and final slag are separated.

The amount of heat required to conduct the mixing and reducing operation in the reducer-mixer is relatively small, and need not be excessively high. The heat value contained in the reducing gases escaping from the reducer-mixer may be utilized for some useful heating purposes, and the cost of the coal used in the reducer-mixer may therefore be divided between two or more operations. This is very important, since the gaseous products of reduction escaping from the reducer-mixer may contain from two-thirds to three-fourths or even more of the heat value of the fuel in a form that may be conveniently utilized for drying, preheating and roasting of the ore about to be charged into the smelting furnace, for firing of a reverberatory furnace, or for other heating purposes, such as making steam, etc. Even the use of a large amount of fuel in the reducer-mixer may be justified because part of the cost may be charged to other useful and necessary operations. If the slag to be treated contains an appreciable amount of cobalt, a prolonged treatment of the slag under reducing conditions will remove a considerable amount of the cobalt from the slag and thereby effect a considerable concentration of the same in the matte.

In order to obtain the desired results economically, it is highly important to provide and maintain practically uniform operating conditions. To this end, in the presently preferred practice of the present invention, the slag is fed practically continuously into the reducer-mixer. In the blast furnace practice, the blast furnace slag is fed continuously into the settler, where it is admixed with the converter slag, and the combined slags are then passed into the reducer-mixer. In the reverberatory furnace practice, the combined reverberatory and converter slags coming from the furnace are fed continuously into the reducer-mixer.

The substantially continuous feeding of slag to the reducer-mixer has important advantages. When the optimum conditions have been established that are practical under the circumstances, in regard to mixing and salting out of the sulfides, the reduction of oxides and silicates in the presence of iron sulfide, and the slag temperature and slag viscosity favorable to the operations, it is comparatively easy to maintain and fairly closely control such optimum conditions. At the same time, this accurate control under such conditions is possible with a minimum of labor and attendance, a minimum of fuel and a minimum of wear and tear on the equipment. The whole treatment becomes comparatively cheap compared to what a batch process would cost, and it should not, therefore, take much saving to justify the treatment. The continuous operation is therefore preferred. But there may be cases where it is economically advantageous to use the more costly batch operation, for example, in the recovery of cobalt.

Nickel sulfide ores subjected to present conventional smelting operations generally contain cobalt in the ratio of about 3-6 parts to about 100 parts nickel. As a result of the treatment of the smelter matte in the converter, a great deal of the cobalt, for example 60 to 90%, is passed into the slag. The cobalt may then be present in the final slag, which has heretofore been discarded, in the ratio, for instance, of about 50 parts to about 100 parts of nickel. In other words, the slag may contain one-half or more as much cobalt as nickel. An important advantage of the present invention may lie in the treatment of such slag in the reducer-mixer to recover the cobalt. By prolonging the treatment, conducted as far as economic conditions justify, a considerable part of the cobalt is reduced and collected in a small amount of copper-nickel-cobalt matte.

In the smelting of nickel-copper ores containing a valuable amount of cobalt, the slags may be treated in accordance with the invention selectively to recover the copper-nickel, or the copper-nickel-cobalt. In addition, if it is desired to recover a substantial amount of the cobalt separately, it is advantageous to proceed as described above in order selectively to recover the copper-nickel, leaving the cobalt in the slag. This cobalt-containing slag is then separately treated in a reducer-mixer in order to throw the cobalt out of the slag. To this end, sufficient fuel and air are injected into the slag to raise it to the temperature at which the oxide and silicate of cobalt are reduced. To insure conversion of the reduced cobalt to cobalt sulfide, a suitable amount if iron sulfide is caused to be present in the slag. This is advantageously accomplished by feeding iron sulfide into the reducer-mixer.

While the cobalt-containing slag, substantially lowered in copper and nickel, may be treated in a reducer-mixer, such as that described above, I prefer to use one of the converter type which may be tilted from position to position during successive stages of the operation. Thus, the reducer-mixer may be tilted at an angle to permit a batch of the slag to be admitted therein while the tuyères are above the normal slag level. As the fuel and air are injected, the reducer-mixer is tilted to locate the tuyères at or near the bottom thereof, so that matte tending to collect at the bottom is intimately admixed with the slag. The reducing-mixing action is conducted until the oxide and silicate of cobalt are reduced and converted to cobalt sulfide by the iron sulfide present in the slag; the reducer-mixer is then tilted to bring the tuyères above the slag level; after which the mixture is permitted to settle while still in the reducer-mixer. The reducer-mixer is next tilted more and more as the top layer of slag is withdrawn and then the lower layer of matte containing the desired cobalt.

The practice of the invention may be considered in conjunction with the specific treatment of slags obtained in the smelting of nickel-copper ores in a blast furnace, the method of obtaining the slags being that described above and illustrated in Fig. 1. The slags were passed while molten from a first settler 11 to and through a reducer-mixer 12 and then to and through a second settler 13, such as illustrated in Figs. 3 and 4. Although the experiments were conducted on a pilot plant scale, the operating conditions were somewhat irregular, as is usual in such cases. On a commercial scale, the operating conditions would, of course, be more regular. In the following table, data is set forth in percentages on typical examples of results obtained in the treatment of such slags. It will be noted that in each of the six (6) examples, data is set forth to indicate the composition of the slag as it went into the reducer-mixer, as well as the composition of the slag as it went out of the second settler. It will be noted that there are some gaps in the data set out below. This is due to a shortage of chemical help. The missing data, however, is not considered essential because more than enough data is reported to show very definite trends in the recovery of the metals sought.

|  | Cu | Ni | Co | SiO₂ | Fe | F₃O₄ | S |
|---|---|---|---|---|---|---|---|
| Slag into reducer-mixer | 0.195 | 0.236 | ------ | 31.60 | 34.05 | 5.25 | 1.41 |
| Slag out of settler | 0.13 | 0.106 | ------ | 31.20 | 34.50 | 4.91 | 1.16 |
| Slag into reducer-mixer | 0.262 | 0.411 | 0.153 | 30.50 | 34.20 | 5.43 | 1.71 |
| Slag out of settler | 0.116 | 0.101 | 0.120 | 31.70 | 34.45 | 3.58 | 1.05 |
| Slag into reducer-mixer | ------ | 0.117 | ------ | 32.10 | 37.50 | ------ | ------ |
| Slag out of settler | 0.112 | 0.068 | 0.084 | 31.66 | 38.10 | ------ | ------ |
| Slag into reducer-mixer | ------ | 0.15 | ------ | 30.60 | 36.33 | 3.41 | 1.56 |
| Slag out of settler | 0.105 | 0.071 | ------ | 31.24 | 37.05 | 3.10 | 1.43 |
| Slag into reducer-mixer | 0.173 | 0.218 | ------ | 28.8 | 38.50 | 5.26 | 1.73 |
| Slag out of settler | 0.132 | 0.088 | ------ | 29.44 | 38.00 | 4.22 | 1.47 |
| Slag into reducer-mixer | 0.185 | 0.268 | 0.123 | 29.14 | 37.92 | 4.53 | 1.78 |
| Slag out of settler | 0.111 | 0.073 | 0.099 | 29.04 | 37.92 | 4.00 | 1.44 |

Referring to the S, sulfur, column, it will be noted that there is an appreciable drop in each of the examples. This clearly demonstrates the salting out of metal sulfides. Referring next to the Fe₃O₄, magnetite, column, it will be noted that there is a very small drop, thus demonstrating that reduction of the magnetite is unnecessary for the reduction of the nickel and copper oxides and silicates. The column for Ni, nickel, illustrates that a substantial amount of the nickel is removed from the slag as it goes through the reducer-mixer and that the nickel is lowered to approximately the same level irrespective of the amount of nickel in the ingoing slag. The Cu, copper, column shows the same trend as the Ni column. Finally, the Co, cobalt, column shows that the nickel and copper are lowered without any substantial lowering of the cobalt content of the slag.

It will be clear to those skilled in this art that the above examples are merely by way of illustration and that the invention readily lends itself to other useful modifications in practice.

I claim:

1. In the method of treating at least two slags of differing composition obtained in the production of nickel and copper by smelting ores of those metals, said slags containing a relatively small but valuable amount of nickel and copper in the form of oxides, silicates and sulfides and a relatively large amount of iron compounds mostly in the form of silicate and relatively small amounts in the form of magnetite and sulfide, one of the slags being relatively high in iron and high in sulfides of copper, nickel and iron in solution in the iron silicate, the other slag being relatively low in iron and low in sulfides of copper, nickel and iron in solution in the iron silicate, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, mixing the combined molten slags above the quiescent body of matte sufficiently to salt out a substantial amount of the sulfides of copper, nickel and iron held in solution by the slag high in iron, subjecting the molten slags while undergoing mixing to reduction with a reducing agent at a suitably elevated temperature, said reducing agent being employed in amount sufficient selectively to reduce the oxides and silicates of the nickel and copper, converting the reduced nickel and copper into sulfides of nickel and copper with iron sulfide, said reducing agent being employed in amount insufficient to reduce a substantial amount of the iron compounds present in the slags, permitting the resulting mixture to remain substantially quiescent in a settling zone, allowing matte prills to merge with matte at the bottom of the settling zone, and separating the final slag from the final matte containing the desired nickel and copper.

2. Method according to the preceding claim, in which the slags are continuously passed through the reducing and mixing zone while the reducing agent is continuously injected into the slags above the quiescent body of matte, the rate of flow of the slags and the rate of injection of the reducing agent being regulated to provide a detention period for the slags in the reducing and mixing zone sufficiently long to permit reduction of the oxides and silicates of the nickel and copper but insufficiently long to permit reduction of a substantial amount of the iron compounds present in the slags, and continuously passing the resulting superposed mixture and the underlying body of matte from the reducing and mixing and the quiescent zones into a settling zone.

3. In the method of treating at least two slags of differing composition obtained in the production of nickel and copper by smelting ores of those metals, said slags containing a relatively small but valuable amount of copper, nickel, and cobalt in the form of oxides, silicates and sulfides and a relatively large amount of iron compounds mostly in the form of silicate and relatively small amounts in the form of magnetite and sulfide, one of the slags being relatively high in iron and high in sulfides of copper, nickel, cobalt and iron in solution in the iron silicate, the other slag being relatively low in iron and low in sulfides of copper, nickel, cobalt and iron in solution in the iron silicate, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, mixing the combined molten slags above the quiescent body of matte sufficiently to salt out a substantial amount of the sulfides of copper, nickel, cobalt and iron held in solution by the slag high in iron, subjecting the molten slags while undergoing mixing to reduction with a reducing agent at a suitably elevated temperature, said reducing agent being employed in amount sufficient selectively to reduce the oxides and silicates of the copper, nickel and cobalt, converting the reduced copper, nickel and cobalt into sulfides of copper, nickel and cobalt with iron sulfide, permitting the resulting mixture to remain substantially quiescent in a settling zone, allowing matte prills of copper, nickel, cobalt and iron sulfides to merge with matte at the bottom of the settling zone, and separating the final slag from the final matte containing the desired nickel, copper and cobalt.

4. Method according to the preceding claim, in which the slags are continuously passed through the reducing and mixing zone while the reducing agent is continuously injected into the slags above the quiescent body of matte, the rate of flow of the slags and the rate of injection of the reducing agent being regulated to provide a detention period for the slags in the reducing and mixing zone sufficiently long to permit reduction of the oxides and silicates of copper, nickel and cobalt, and continuously passing the resulting superposed mixture and the underlying body of matte from the reducing and mixing and the quiescent zones into a settling zone.

5. In the method of treating slags obtained in the production of nickel and copper by smelting ores of those metals, said slags containing a relatively small but valuable amount of nickel and copper in the form of oxides, silicates and sulfides and a relatively large amount of iron compounds mostly in the form of silicate and relatively small amounts in the form of magnetite and sulfide, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, subjecting the molten slags above the quiescent body of matte to reduction with a reducing agent while mixing the slags at a suitably elevated temperature, said reducing agent being employed in amount sufficient selectively to reduce the oxides and silicates of the nickel and copper, converting the reduced nickel and copper into sulfides of nickel and copper with the iron sulfide present in the slags, said reducing agent being employed in amount insufficient to reduce a substantial amount of the iron compounds present in the slags, permitting the resulting mixture to remain substantially quiescent in a settling zone, allowing matte prills of copper, nickel and iron sulfide to merge with matte at the bottom of the settling zone, and separating the final slag from the final matte containing the desired nickel and copper.

6. Method according to claim 5, in which the slags are continuously passed through the reducing and mixing zone while the reducing agent is continuously injected into the slags above the quiescent body of matte, the rate of flow of the slags and the rate of injection of the reducing agent being regulated to provide a detention period for the slags in the reducing and mixing zone sufficiently long to permit reduction of the oxides and silicates of the nickel and copper but insufficiently long to permit reduction of a substantial amount of the compounds of iron.

7. Method according to claim 5, in which the reducing and mixing actions are obtained by injecting fuel and air into the molten slags above the quiescent body of matte.

8. Method according to claim 5, in which the reducing and mixing actions are obtained by injecting fuel and air into the molten slags above the quiescent body of matte, the slags are continuously passed through the reducing and mixing zone while the reducing agent is continuously injected into the slags, the rate of flow of the slags and the rate of injection of the reducing agent being regulated to provide a detention period for the slags in the reducing and mixing zone sufficiently long to permit reduction of the oxides and silicates of the nickel and copper but insufficiently long to permit reduction of a substantial amount of the compounds of iron.

9. In the method of treating slags obtained in the production of nickel and copper by smelting ores of those metals, said slags containing a relatively small but valuable amount of copper, nickel and cobalt in the form of oxides, silicates and sulfides and a relatively large amount of iron compounds mostly in the form of silicate and relatively small amounts in the form of magnetite and sulfide, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, subjecting the molten slags above the quiescent body of matte to reduction with a reducing agent while mixing the slags at a suitably elevated temperature, said reducing agent being employed in amount sufficient selectively to reduce the oxides and silicates of the copper, nickel and cobalt, converting the reduced nickel, copper and cobalt into sulfides of nickel, copper and cobalt with the iron sulfide present in the slags, permitting the resulting mixture to remain substantially quiescent in a settling zone, allowing matte prills of copper, nickel, cobalt and iron sulfide to merge with matte at the bottom of the settling zone, and separating the final slag from the final matte containing the desired nickel, copper and cobalt.

10. Method according to the preceding claim, in which the slags are continuously passed through the reducing and mixing zone while the reducing agent is continuously injected into the slags above the quiescent body of matte, the rate of flow of the slags and the rate of injection of the reducing agent being regulated to provide a detention period for the slags in the reducing and mixing zone sufficiently long to permit reduction of the oxides and silicates of copper, nickel and cobalt, and continuously passing the resulting superposed mixture and the underlying body of matte from the reducing and mixing and the quiescent zones into a settling zone.

11. In the method of treating at least two slags of differing composition obtained in the production of copper by smelting copper-bearing ores, said slags containing a relatively small but valuable amount of copper in the form of oxide, silicate and sulfide and a relatively large amount of iron compounds mostly in the form of silicate and relatively small amounts in the form of magnetite and sulfide, one of the slags being relatively high in iron and high in sulfides of copper, and iron in solution in the iron silicate, the other slag being relatively low in iron and low in sulfides of copper and iron in solution in the iron silicate, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, mixing the combined molten slags above the quiescent body of matte sufficiently to salt out a substantial amount of the sulfides of copper and iron held in solution by the slag high in iron, subjecting the molten slags while undergoing mixing to reduction with a reducing agent at a suitably elevated temperature, said reducing agent being employed in amount sufficient selectively to reduce the oxide and silicate of the copper, converting the reduced copper into sulfide of copper with iron sulfide present in the slags, said reducing agent being employed in amount insufficient to reduce a substantial amount of the iron compounds present in the slags, permitting the resulting mixture to remain substantially quiescent in a settling zone, allowing matte prills of copper and iron sulfides to merge with matte at the bottom of the settling zone, and separating the final slag from the final matte containing the desired copper.

12. Method according to the preceding claims, in which the slags are continuously passed through the reducing and mixing zone while the reducing agent is continuously injected into the slags above the quiescent body of matte, the rate of flow of the slags and the rate of injection of the reducing agent being regulated to provide a detention period for the slags in the reducing and mixing zone sufficiently long to permit reduction of the oxide and silicate of the copper but insufficiently long to permit reduction of a substantial amount of the iron compounds present in the slags, and continuously passing the resulting superposed mixture and the underlying body of matte from the reducing and mixing and the quiescent zones into a settling zone.

13. In the method of treating slags obtained in the production of copper by smelting copper-bearing ores, said slags containing a relatively small but valuable amount of copper in the form of oxide, silicate and sulfide and a relatively large amount of iron compounds mostly in the form of silicate and relatively small amounts in the form of magnetite and sulfide, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, subjecting the molten slags above the quiescent body of matte to reduction with a reducing agent while mixing the slags at a suitably elevated temperature, said reducing agent being employed in amount sufficient selectively to reduce the oxide and silicate of copper, converting the reduced copper with iron sulfide present in the slags into sulfide of copper, permitting the resulting mixture to remain substantially quiescent in a settling zone, allowing matte prills to merge with matte at the bottom of the settling zone, and separating the final slag from the final matte containing the desired copper.

14. Method according to the preceding claim, in which the slags are continuously passed through the reducing and mixing zone while the reducing agent is continuously injected into the slags above the quiescent body of matte, the rate of flow of the slags and the rate of injection of the reducing agent being regulated to provide a detention period for the slags in the reducing and mixing zone sufficiently long to permit reduction of the oxide and silicate of the copper but insufficiently long to permit reduction of a substantial amount of the iron compounds present in the slags, and continuously passing the resulting superposed mixture and the underlying body of matte from the reducing and mixing zone into a settling zone.

15. In the method of treating slags obtained in the production of nickel and copper by smelting ores of those metals, said slags containing a relatively small but valuable amount of copper, nickel and cobalt in the form of oxides, silicates and sulfides and a relatively large amount of iron compounds mostly in the form of silicate and relatively small amounts in the form of magnetite and sulfide, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, subjecting the molten slags above the quiescent body of matte to reduction with a reducing agent while mixing the slags at a suitably elevated temperature, said reducing agent being employed in amount sufficient selectively to reduce the oxides and silicates of the copper and nickel, converting the reduced copper and nickel with iron sulfide present in the slags into sulfides of copper and nickel, said reducing agent being insufficient to reduce a substantial amount of compounds of cobalt and iron, permitting the resulting mixture to remain substantially quiescent in a settling zone, allowing matte prills of copper, nickel and iron sulfides to merge with matte at the bottom of the settling zone, separating the slag from the matte containing the desired copper and nickel, subjecting said latter slag containing the cobalt while undergoing mixing to reduction at a suitably elevated temperature, the reducing agent being employed in amount sufficient to reduce the oxide and silicate of cobalt, converting the reduced cobalt to cobalt sulfide with iron sulfide, permitting the resulting mixture to remain substantially quiescent in a settling zone, allowing matte prills of cobalt and iron sulfides to merge with matte at the bottom of the settling zone, separating the final slag from the final matte containing the desired cobalt.

16. In the method of treating at least two slags of differing composition obtained in the production of nickel and copper by smelting ores of those metals, said slags containing a relatively small but valuable amount of copper, nickel and cobalt in the form of oxides, silicates and sulfides and a relatively large amount of iron compounds mostly in the form of silicate and relatively small amounts in the form of magnetite and sulfide, one of the slags being relatively high in iron and high in sulfides of copper, nickel, cobalt and iron in solution in the iron silicate, the other slag being relatively low in iron and low in sulfides of copper, nickel, cobalt and iron in solution in the iron silicate, the improvement which comprises passing the slags while molten into a reducing and mixing zone, collecting a body of matte in a quiescent zone below the reducing and mixing zone and maintaining the body of matte in contact with the superposed body of slags to facilitate settling out of matte prills, mixing the combined molten slags above the quiescent body of matte sufficiently to salt out a substantial amount of the sulfides of copper, nickel, cobalt and iron held in solution by the slag high in iron, subjecting the molten slags to reduction with a reducing agent while mixing the slags at a suitably elevated temperature, said reducing agent being employed in amount sufficient selectively to reduce the oxides and silicates of the copper and nickel, converting the reduced copper and nickel with iron sulfide present in the slags into sulfides of copper and nickel, said reducing agent being insufficient to reduce a substantial amount of the compounds of cobalt and iron, permitting the resulting mixture to remain substantially quiescent in a settling zone, allowing matte prills of copper, nickel and iron sulfides to merge with matte at the bottom of the settling zone, separating the slag from the matte containing the desired copper and nickel, subjecting said latter slag containing the cobalt while undergoing mixing to reduction at a suitably elevated temperature, the reducing agent being employed in amount sufficient to reduce the oxide and silicate of cobalt, converting the reduced cobalt to cobalt sulfide with iron sulfide, permitting the resulting mixture to remain substantially quiescent in a settling zone, allowing matte prills of cobalt and iron sulfides to merge with matte at the bottom of the settling zone, separating the final slag from the final matte containing the desired cobalt.

17. Method according to the preceding claim in which the slags of differing composition are continuously passed through the first reducing and mixing zone while the reducing agent is continuously injected into the slags above the quiescent body of the matte, the rate of flow of the slags and the rate of injection of the reducing agent being regulated to provide a detention period for the slags in the reducing and mixing zone sufficiently long to permit reduction of the oxides and silicates of the copper and nickel but insufficiently long to permit reduction of a substantial amount of the compounds of cobalt and iron, and continuously passing the resulting superposed mixture and the underlying body of matte from the reducing and mixing and the quiescent zones into a settling zone.

ANTON MARTIN GRONNINGSAETER.

REFERENCES CITED

The following references are of record in the file of this patent:

UNITED STATES PATENTS

| Number | Name | Date |
|---|---|---|
| 1,372,047 | Stout | Mar. 22, 1921 |
| 1,822,588 | Fowler et al. | Sept. 8, 1931 |
| 1,868,414 | Gronwall | July 19, 1932 |

Certificate of Correction

Patent No. 2,438,911.

April 6, 1948.

ANTON MARTIN GRONNINGSAETER

It is hereby certified that errors appear in the printed specification of the above numbered patent requiring correction as follows: Column 4, line 75, for "af" read *of*; column 5, line 74, for the word "sulfides" read *sulfide*; column 11, line 27, for "hgiher" read *higher*; line 57, for "valve" read *value*; column 18, line 40, claim 14, after "mixing" insert *and the quiescent*; line 41, same claim, for "zone" first occurrence read *zones*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*